(12) United States Patent
Vargo et al.

(10) Patent No.: US 6,402,077 B1
(45) Date of Patent: Jun. 11, 2002

(54) WINDER WITH VARIABLE TENSION ZONES

(75) Inventors: Richard David Vargo, Cuyahoga Falls; Robert Henry Vogliano, Tallmadge, both of OH (US)

(73) Assignee: The Goodyear Tire & Rubber Company, Akron, OH (US)

(*) Notice: Subject to any disclaimer, the term of this patent is extended or adjusted under 35 U.S.C. 154(b) by 0 days.

(21) Appl. No.: 09/783,677

(22) Filed: Feb. 14, 2001

(51) Int. Cl.⁷ .......................... B65H 18/08; B65H 23/10
(52) U.S. Cl. ................ 242/419.5; 242/419.6; 242/530.2; 242/538
(58) Field of Search .............. 242/419.4, 419.5, 242/419.6, 419.7, 419.8, 530.2, 538

(56) References Cited

U.S. PATENT DOCUMENTS

| | | | | |
|---|---|---|---|---|
| 2,681,702 A | * | 6/1954 | Kuenn et al. ............. | 242/530.2 |
| 2,831,526 A | | 4/1958 | Procopio | |
| 3,312,414 A | * | 4/1967 | Knapp ..................... | 242/419.6 |
| 3,380,679 A | | 4/1968 | Komas et al. | |
| 3,405,883 A | * | 10/1968 | Breitmeier et al. ...... | 242/419.6 |
| 3,712,553 A | * | 1/1973 | Napor et al. ............. | 242/530.2 |
| 3,941,332 A | | 3/1976 | Matula | |
| 3,946,960 A | * | 3/1976 | Hunter ..................... | 242/530.2 |
| 3,979,079 A | | 9/1976 | Ohashi et al. | |
| 4,052,245 A | | 10/1977 | Kuts | |
| 4,170,504 A | | 10/1979 | Riggs | |
| 4,352,467 A | | 10/1982 | Dunn et al. | |
| 4,365,767 A | | 12/1982 | Benthimere | |
| 4,447,014 A | * | 5/1984 | Azuma et al. ........... | 242/530.2 |
| 4,467,975 A | | 8/1984 | Friedman | |
| 4,580,738 A | | 4/1986 | Scheer | |
| 4,951,892 A | | 8/1990 | Chaplin et al. | |
| 5,282,584 A | | 2/1994 | Yano | |
| 5,516,058 A | | 5/1996 | Omokawa et al. ....... | 242/413.6 |

* cited by examiner

*Primary Examiner*—John M. Jillions
(74) *Attorney, Agent, or Firm*—Nancy T. Krawczyk

(57) ABSTRACT

The present invention is directed to a winding bay and a method of winding to provide for a high quality wind of a viscoelastic material. A viscoelastic material and a supporting liner are wound onto a roll. After unwinding the liner from a liner let-off roll, the liner is guided under high tension. Before guiding the viscoelastic material onto the liner, the tension in the liner is isolated to reduce the tension in the liner. The viscoelastic material is guided onto the liner, and the viscoelastic material and the supporting liner are wound onto a windup roll.

7 Claims, 3 Drawing Sheets

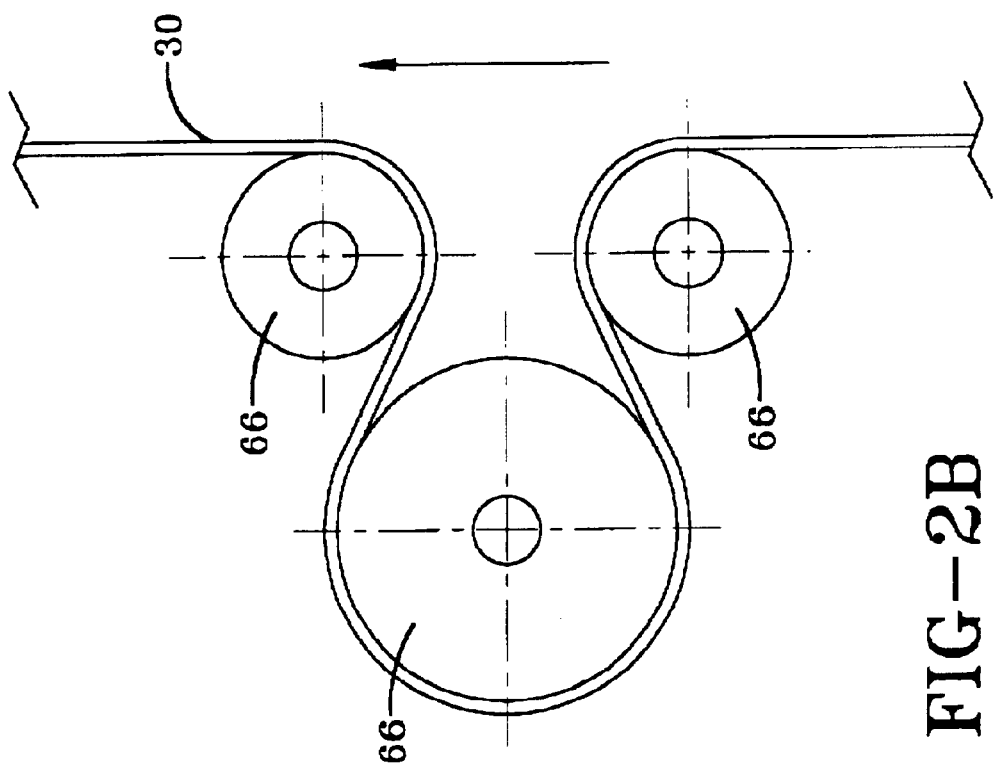
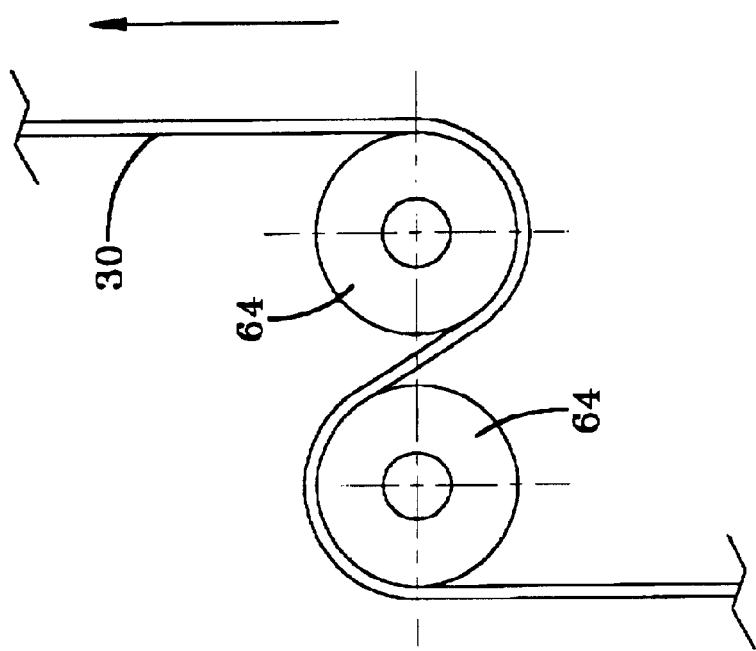

WINDER WITH VARIABLE TENSION ZONES

FIELD OF THE INVENTION

The present invention is directed to a winder. More specifically, the present invention is directed to a method and apparatus for winding viscoelastic material in a manner to reduce distortion of the material after winding of the material onto a roll.

BACKGROUND OF THE INVENTION

Windup of tire components is an important part of the tire manufacturing process. It has obvious advantages such as in handling, storage, transportation and some tire machines are built to accept only wound components either spooled or rolled. However there are also disadvantages. If the wound component is a contoured component, as opposed to a flat sheet material, the component may become distorted in the winding/storage process. If the component is formed from a low rolling resistance material, the problem can worsen, as such material is very tacky and usually softer.

If distortion occurs when tire components such as belts and carcass materials are wound up, the ends-per-inch count of the wire may change and the material may have to be rejected. In other applications, if the components become crushed, separation from the liner becomes difficult, if not impossible. Calendered material may be distorted and flattened in the center of rolls and sometimes has to be cut away from the liner, wasting expensive liner, time, and material.

All of these problems share a common denominator-distortion due to pressure seen in the windup and storage process.

Center driven winders receive the energy to wind the roll by a motor that rotates a shaft connected to either the shell or the core of the roll. Winding tension is applied by pulling on either the support liner or the component wound on the liner or both. Winding tension control, that is, how the applied tension to the component being wound is varied as the package grows in size during winding, is critical in this type of winding setup.

FIG. 3 illustrates a prior art winding bay 10. A winding platform 1 wheels 14, has a base 16 of either an open square or two side frames upon which are two vertical support frames 18, 20. On each vertical support frame 18, 20 is an axle 22, 24 mounted rotatably on the frame 18, 20, and a roll 26, 28 is mounted on each axle 22, 24. One roll 28 is the windup roll onto which a liner 30 and a stock material 32 are wound. The other roll 26 is the liner let-off roll off, of which the liner 30 is wound when the stock material 32 is wound onto the windup roll 28 and onto which the liner 30 is wound when stock material 32 is removed from the windup roll 28. material 32 is wound onto the windup roll 28 and onto which the liner 30 is wound when stock material 32 is removed from the windup roll 28.

Adjacent to the letoff roll side of the winding platform 12 is the let-off section 34 of the winding bay 10, comprising a plurality of guide rolls. In the illustrated guide mechanism, the liner 30 passes over two top guide rolls 36, 38, through a guide 40 whose function is to spread and de-wrinkle the liner, and over guide rolls 42, 44. The liner 30 then passes under the winding platform 12 and about another pair of rolls 46. After passing about guide roll 48, the liner 30 then contacts the stock material 32 at roll 50 and is wound onto the windup roll 28. The stock material 32 is also guided by rolls 52, 54 before contacting the liner 30.

The primary function of the tension in the liner 30 is to provide proper tracking, guiding, and de-wrinkling during winding. Due to other factors, e.g. misaligned rolls, bearings that are not freely turning, miswound support liners, higher winding tensions are needed to guide and de-wrinkle the liner 30. To provide a high quality wind, one that imparts minimal damage to the wound component, the actual winding tension needed is low.

Thus, the liner 30, during winding and unwinding, is subject to high tension. High winding tension is developed in the letoff section 34 of the winder 10 to provide sufficient tracking and de-wrinkling. This tension is carried into the windup roll 28 and into the stock material 32 being wound. The tension can be thought of as energy that is wound into the roll 28. The dissipation of this energy occurs through the viscoelastic rubber of the stock material 32, causing the stock material 32 to flow, resulting in distortion of the profiles and contours of the component, and sticking to the liner 30.

SUMMARY OF THE INVENTION

The present invention is directed to a winding bay and a method of winding that overcomes the limitations of the known winders and winding systems and provides for a high quality wind in the winding bay, minimizing component distortion and stuck-to-liner problems.

Disclosed is a method of winding a viscoelastic material wherein the material and a supporting liner are to be wound onto a roll. The method includes unwinding a liner from a roll, guiding the liner under high tension, guiding the viscoelastic material onto the liner, and winding the viscoelastic material and the supporting liner onto a roll. Before guiding the viscoelastic material onto the liner, the tension in the liner is isolated reduce the tension in the liner.

In one aspect of the disclosed invention, passing the liner through a pair of nip rollers isolates the tension.

Also disclosed is a winding bay for winding a viscoelastic material and a supporting liner onto a roll. The winding bay has a let-off roll, a windup roll, and a plurality of guide rolls to guide the viscoelastic material and the supporting liner. A tension isolation device is located prior to the windup roll to reduce the tension in the liner prior to winding the material and the liner onto the windup roll.

In one aspect of the disclosed invention, the tension isolation device is a pair of nip rollers. In another disclosed aspect, the tension isolation device employs an "s" wrap or "omega" wrap geometry.

BRIEF DESCRIPTION OF THE DRAWINGS

The invention will be described by way of example and with reference to the accompanying drawings in which:

FIG. 2a is a tension isolation geometry;

FIG. 2b is another tension isolation geometry; and

DETAILED DESCRIPTION OF THE PREFERRED EMBODIMENTS

Figure 1:
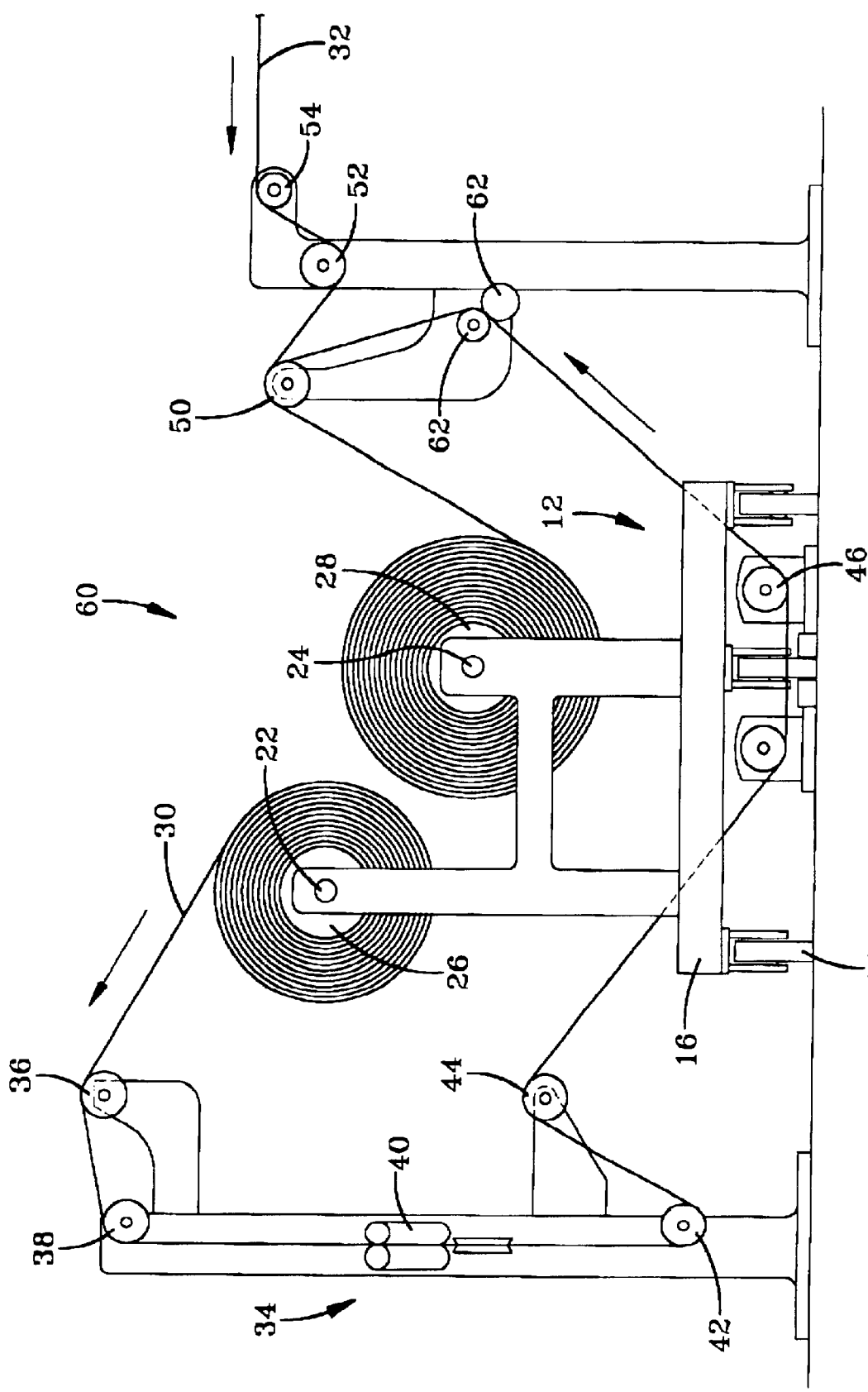
FIG. 1 is a center driven winder in accordance with the present invention.
Figure 3:
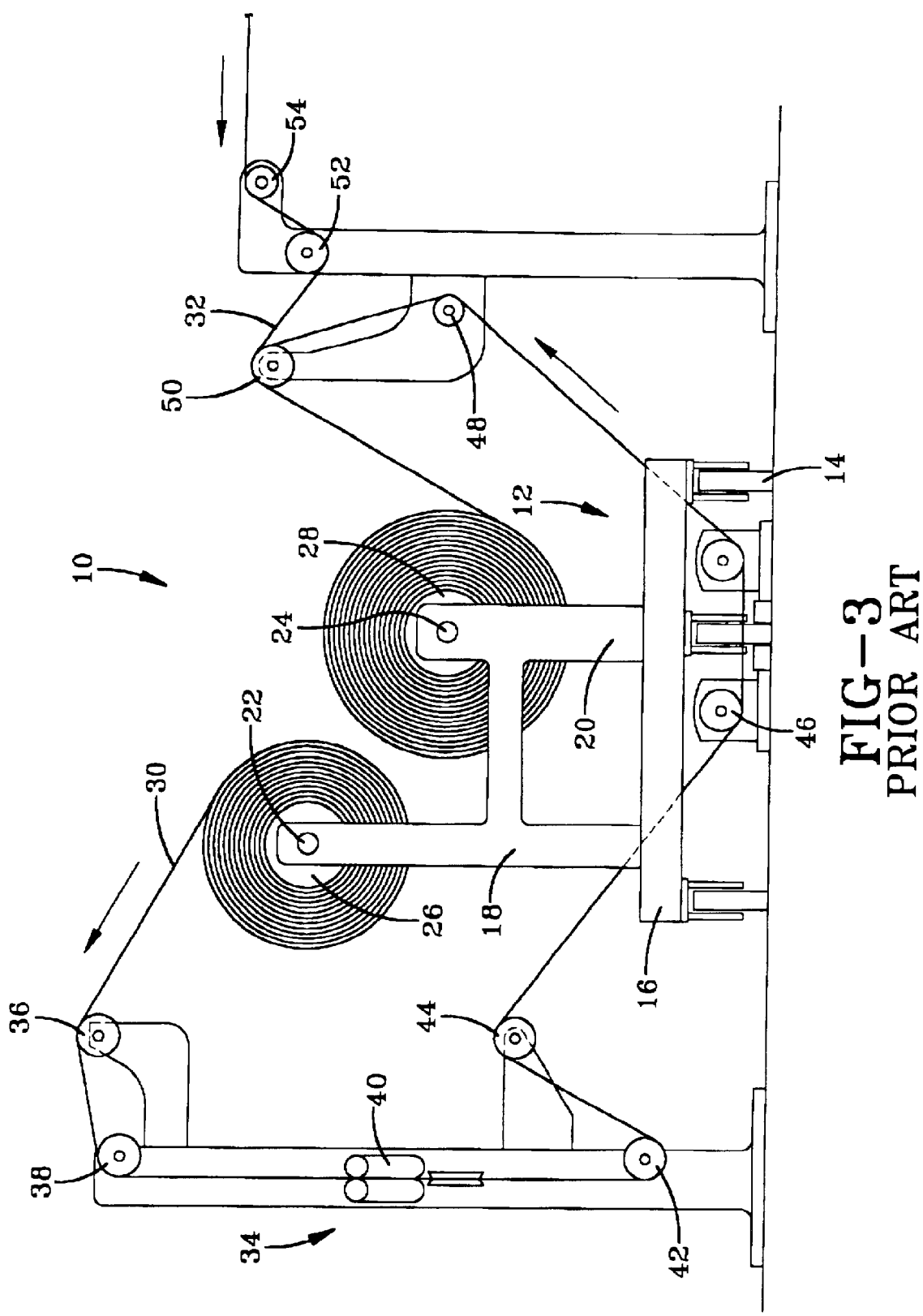
FIG. 3 illustrates a prior art center driven winder.

FIG. 1 illustrates a winding bay 60 modified in accordance with the present invention. The winding bay 60 is similar to the prior art winding bay 10 except that the wind bay 60 has means to form different tension regions. For convenience, those items which are the same in the prior art winding bay 10 have the same reference number.

In the operation illustrated in FIG. 1, the liner 30 is being unwound from the letoff roll 26 and being wound, with the stock material 32, onto the windup roll 28. During this operation, the axle 22 going though the letoff roll 26 is connected to a brake (not illustrated) and the axle 24 in the windup roll 28 is connected to a motor (not illustrated). The motor provides the power required to pull the liner 30 through the winding bay while the brake on the letoff roll axle 22 controls the tension at which the liner 30 is maintained when going through the let-off section 34. As the liner 30 passes through the let-off section 34, high tension is maintained for guiding and de-wrinkling.

After the liner 30 passes through the let-off section 34, high tension is no longer required. Before the liner 30 contacts the stock material 32, the tension in the liner 30 is isolated to result in a low tension in the liner 30 for when the liner 30 contacts the stock material 32. Isolation of the tension may be achieved by the illustrated nip rolls 62 or by other tension isolation geometry's such as the "s" wrap, i.e. passing the liner 30 about a pair of rolls 64 arranged to give the liner 30 an "!" shaped travel path, see FIG. 2a, or an omega wrap, see FIG. 2b, wherein the liner 30 is wrapped about three rolls 66 to form an omega shaped travel path. By isolating the tension in this manner, different tension regions are created: a high tension region for guiding and de-wrinkling the liner 30 and a low tension region for the actual winding of the liner 30 and the viscoelastic stock material 32.

When the stock material 32 is wound onto the windup roll 28 at low tension, less energy is absorbed into the viscoelastic material 32, thus reducing the need for the material 32 to dissipate the stored energy by "relaxing" or flowing and deforming from any original contoured configuration.

The stock material 32 wound onto the windup roll is any flexible continuous longitudinally extending component wherein at least part of the material is formed from a viscoelastic material such as rubber, thermoplastics, or thermoelastics. In the preferred use of the winder in a tire manufacturing process, the stock material 32 can be any tire components such as tire tread, sidewalls, belt plies, carcass materials, or inner liner material. The liner 30 must be flexible and preferably has a surface to discourage the stock material 32 from adhering to the liner 30.

The winding bay 60 is also provided with a load cell (not illustrated) in the low tension region. The load cell provides feedback to the brake on the letoff roll axle 22 so that the winding tension profile is consistently maintained as the diameter of the material on the windup roil 26 increases.

It should be noted, as stated above in regard to the prior art winding bay 10, that the particular arrangement of guide rolls and spreading and dewrinkling apparatus in the winding bay may be varied. Such guide rolls and apparatus may be attached to the winding platform 12. Also, with possible variations in the arrangement of guide rolls, the actual path traveled by the liner 30 and stock material 32 may differ.

What is claimed is:

1. A method of winding a viscoelastic material wherein the material and a supporting liner are to be wound onto a roll, the method comprising:

unwinding a liner from a roll, guiding the liner under high tension, guiding the viscoelastic material onto the liner, winding the viscoelastic material and the supporting liner onto a roll, wherein the method is characterized by:

prior to guiding the viscoelastic material onto the liner, isolating the tension in the liner to reduce the tension in the liner.

2. A method of winding in accordance with claim 1 wherein the method is characterized by isolating the tension by passing the liner through a pair of nip rollers.

3. A method of winding in accordance with claim 1 wherein the method is characterized by isolating the tension by passing the liner around a set of rollers so the liner passes through "s" configuration.

4. A method of winding in accordance with claim 1 wherein the method is characterized by isolating the tension by passing the liner around a set of rollers so the liner passes through an omega wrap configuration.

5. A winding bay for winding a viscoelastic material and a supporting finer onto a roll, the winding bay comprising a let-off roll, a windup roll, and a plurality of guide rolls to guide the viscoelastic material and the supporting liner, wherein a portion of the guide rollers maintain a high tension in the supporting liner adjacent to the let-off roll, the winding bay being characterized by:

a tension isolation device being located prior to the windup roll, the tension isolation device reducing the tension in the supporting liner.

6. A winding bay in accordance with claim 5 wherein the winding bay is characterized by the tension isolation device being at least a pair of adjacent rollers.

7. A winding bay in accordance with claim 6 wherein the winding bay is characterized by the tension isolation device being at least three rollers about which the liner is wrapped.

* * * * *